United States Patent [19]

Date et al.

[11] 4,182,557
[45] Jan. 8, 1980

[54] SINGLE LENS REFLEX CAMERA CAPABLE OF HIGH SPEED CONTINUOUS PHOTOGRAPHY

[75] Inventors: Nobuaki Date; Hiroshi Aizawa, both of Kawasaki; Masanori Uchidoi, Yokohama; Tomonori Iwashita, Fuchu; Masami Shimizu, Tokyo, all of Japan

[73] Assignee: Canon Kabushiki Kaisha, Tokyo, Japan

[21] Appl. No.: 906,629

[22] Filed: May 16, 1978

[30] Foreign Application Priority Data

May 19, 1977 [JP] Japan .................................. 52-57940

[51] Int. Cl.$^2$ .......................... G03B 7/00; G03B 9/08; G03B 19/12; G03B 17/42
[52] U.S. Cl. .................................. 354/60 R; 354/152; 354/173; 354/266
[58] Field of Search .................. 354/38, 51, 152, 153, 354/156, 171, 173, 204, 205, 212, 266, 267, 270, 60 R

[56] References Cited

U.S. PATENT DOCUMENTS

| | | | |
|---|---|---|---|
| 3,675,557 | 7/1972 | Yokozato et al. | 354/153 |
| 3,731,609 | 5/1973 | Kobayashi et al. | 354/152 |
| 3,852,779 | 12/1974 | Yamamichi et al. | 354/51 |
| 3,946,408 | 3/1976 | Taguchi | 354/51 |
| 4,034,385 | 7/1977 | Arai | 354/38 |
| 4,086,581 | 4/1978 | Ito et al. | 354/38 X |

*Primary Examiner*—L. T. Hix
*Assistant Examiner*—William B. Perkey
*Attorney, Agent, or Firm*—Toren, McGeady and Stanger

[57] ABSTRACT

A single lens reflex camera capable of the high speed continuous photographing. It achieves high speed continuous photography by means of an automatic winding up device, designed so that, in order to shorten the photographing time, the mirror and the diaphragm are kept in the state wherein the first photograph is taken during the continuous photography.

2 Claims, 5 Drawing Figures

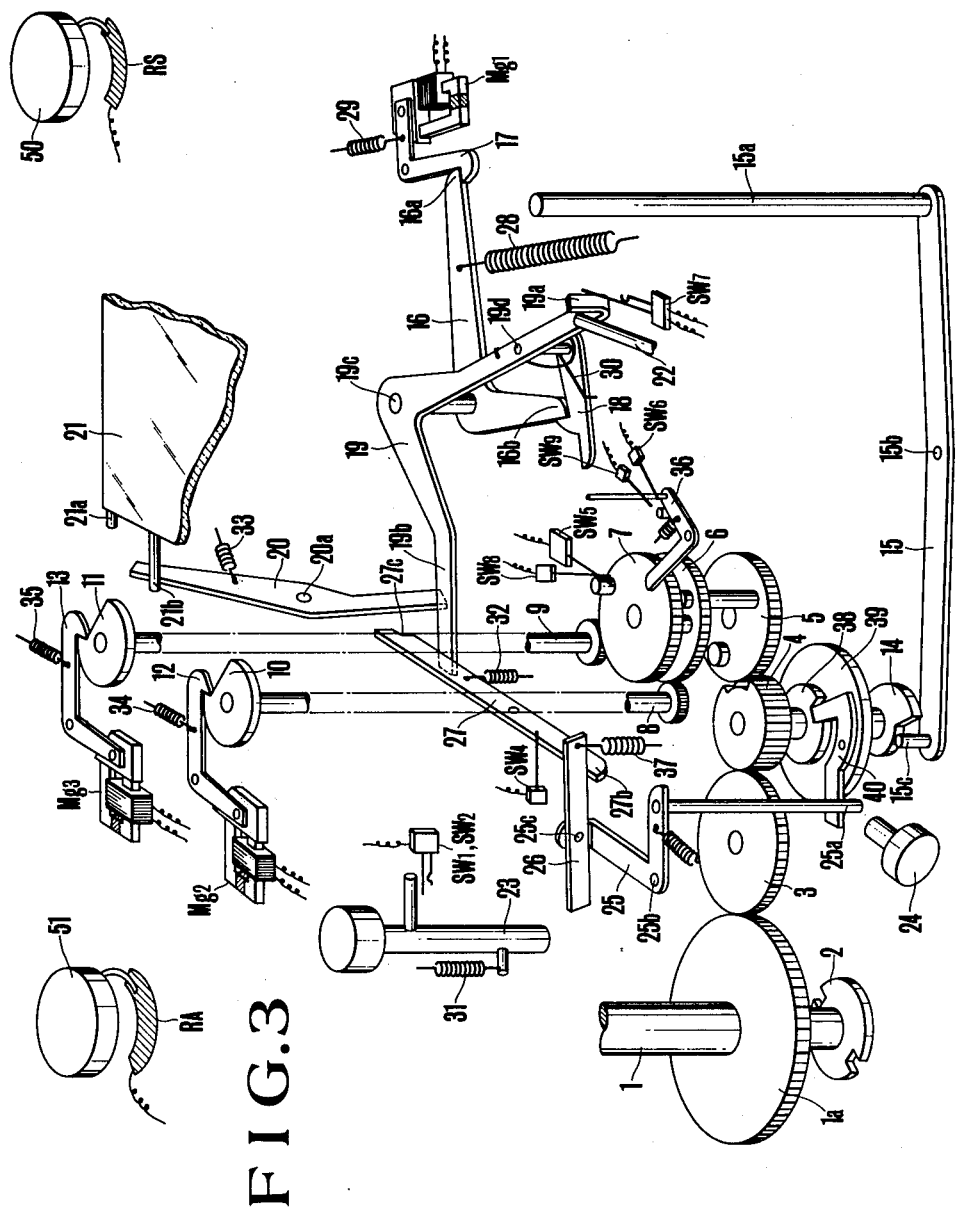
F I G. 3

SINGLE LENS REFLEX CAMERA CAPABLE OF HIGH SPEED CONTINUOUS PHOTOGRAPHY

BACKGROUND OF THE INVENTION

The present invention relates to a single lens reflex camera capable of continuous photographing, particularly enabling high speed continuous photography by means of an automatic winding up device.

Many single lens reflex camera capable of continuous photographing by mounting the automatic winding up device have been proposed. With respect to this kind of camera, the time needed for taking one photograph at the time of continuous photographing depends upon the time during which the automatic winding up device completes the camera winding up and the shutter is released and the time during which, after the shutter release the winding up operation for the next photographing starts. Considering these time periods, the time commencing with the start of winding up until the shutter release depends upon the work of the camera driven by means of the winding up mechanism, namely, the winding up moment and the rotation angle. The work is divided in the film feeding, the shutter winding up, the mirror operation and the diaphragm mechanism setting. Further, the time from the camera release until the start of the next winding up operation is the addition of the operation time of the diaphragm operation mechanism and the mirror operation time after the shutter release, the running time of the shutter curtain, the shutter time forming time and so on. Depending upon the kind of camera the stabilizing time for the stopped mechanism for the diaphragm and the mirror, the information memorizing time for the automatic exposure and so on add to the above time.

Consequently, in order to shorten the time needed for one photograph at the time of the continuous photographing with the automatic winding up device so as to enable the high speed continuous photography, it is necessary to provide a means for shortening the previously mentioned times, whereby in the case of the high speed photography it is effective to adopt the photographic mode in which the diaphragm operation and the mirror operation are excluded. In this way, the work of the automatic winding up device will be only the film feeding and the shutter winding up, so that the time needed for taking a photograph can be shortened. Further, considering the operation times after the shutter release, the time needed for the diaphragm operation and that for the shutter operation are comparatively long with reference to the running time of the shutter curtain in the case of the short shutter time, it is possible to shorten the operation time after the shutter release by adopting the photographic mode in which the above mentioned operations are eliminated.

A camera whose diaphragm operation mechanism and the mirror operation mechanism are omitted so as to enable high speed continuous photography has been proposed. Namely, in the case of this kind of camera, a fixed mirror is adopted instead of the totally reflecting movable mirror necessary for the single reflex camera. A fixed half-permeable mirror is used, while the diaphragm is manually set and locked so as to carry out high speed continuous photographing. By means of this kind of camera, high speed photographing of as many as 9 pictures a second is possible. Because the fixed half-permeable mirror is used, the amount of the light into the view finder is not so great so that the range finding is difficult, which is inconvenient. In other words, the camera is convenient for special application but inconvenient for ordinary photography, namely for the ordinary and the low speed continuous photography.

Since the camera is not only convenient for ordinary photographing but is also capable of high speed continuous photographing is contemplated a camera, which is provided with a photographic mode change over mechanism designed in such a manner that the ordinary diaphragm operation as well as the ordinary mirror operation are carried out in the case of ordinary photography by means of the manual winding up or the low speed automatic winding up while both of the mechanisms are made inoperable only in the case of the high speed continuous photographing. For this purpose, either the method in accordance with which the totally reflecting movable mirror to be used in the case of ordinary photographing is replaced with the fixed mirror and the diaphragm is manually set and locked in the case of the high speed continuous photographing, or the method in accordance with which the photograph is taken after the scene has been determined, with the camera being fixed on a tripod or the like, the mirror manually lifted up and the diaphragm manually set and locked. However, in many cases very high speed continuous photographing is needed, quick and sure operability are required so that the above methods lack practicability.

SUMMARY OF THE INVENTION

The purpose of the present invention is to offer a single reflex camera on which an automatic winding up device can be mounted, free from the shortcoming of the conventional camera, particularly designed in such a manner that, in the case of ordinary photographing, the diaphragm operation mechanism and the mirror operation mechanism operate in the same way as in the case of the conventional single lens reflex camera. Further, a photograph is taken each time or continuous photographing is carried out at ordinary speed, while the object image is being observed in the view finder. In the case of high speed continuous photographing, the diaphragm operation mechanism and the mirror operation mechanism are changed over into the non operable state so as to shorten the time need for taking one picture, and immediately after the termination of the release operation at the completion of the photographing, the diaphragm is totally opened while the mirror assumes the initial position in such a manner that the object image can be confirmed again. The camera in accordance with the present invention is provided with a change over means for changing over between each other the ordinary photographic mode in which the diaphragm and the mirror are operable and the high speed continuous photographic mode in which the diaphragm and the mirror are made inoperable, in such a manner that, in the case of the high speed photographic mode and only for the firs picture after the shutter release, the diaphragm and the mirror are operated in the same way as in the case of the ordinary photographic mode. For the pictures after the first one, the diaphragm is kept in the closed state while the mirror is kept in the lifted up state. Immediately after completion of the photographing, at the termination of the release operation, the locking of the diaphragm and that of tue mirror are released so that the diaphragm is tc ally opened while the mirror resumes the initial state.

Hereby, the single lens reflex camera of the ordinary exposure control system in accordance with the present invention is so designed that the measured light value immediately before the shutter release operation is memorized and maintained until the termination of the continuous photographing because the light sensing element is arranged in the view finder system.

DESCRIPTION OF PREFERRED EMBODIMENT

Brief Description of the Drawings

Below, the present invention will be explained in detail in accordance with the accompanying drawings.

FIG. 1 shows the state for the ordinary photographic mode in which the shutter has been wound up, while FIG. 2 shows the state for the high speed continuous photographic mode in which the shutter has been wound up.

FIG. 3 shows the internal mechanism of another embodiment of the camera in accordance with the present invention in the state for the ordinary photographic mode in which the shutter has been wound up.

In FIGS. 1 and 2, 1 is the winding up shaft operatively engaged with a conventional winding up lever (not shown in the drawing), on which the gear 1a is secured and at whose lower end the coupler 2 to be engaged with the winding up shaft of the automatic winding up device. 3 and 4 are the intermediary gears for transferring the rotation of the gear 1 to the (not shown) film feeding mechanism respectively to the charging mechanism of the focal plane shutter, while 4 is a gear with a notch part 4a on the upper part, being engaged with gear 3 with the lower part and the main gear 5 for winding up the shutter with the upper part. Along with the rotation of the gear by a certain determined angle, the gear 4 makes one rotation, whereby in the state in which the shutter has been wound up, the notch part 4a of the gear 4 is positioned so as to face to the main gear 5 as is shown in the drawing in such a manner that the gear 4 is disengaged from the gear 5 so that the main gear 5 returns to a certain determined position. 6 is the leading shutter curtain winding up gear, while 7 is the tail shutter curtain winding up gear. Both gears are rotatably provided on the same gear as of the main gear so as to be operatively engaged with the winding up gear 1a in such a manner that, when the main gear 5 is rotated, the pins 5a and 6a are respectively engaged with the pins 6b and 7b so that the both gears are rotated along the same direction.

Figure 1:
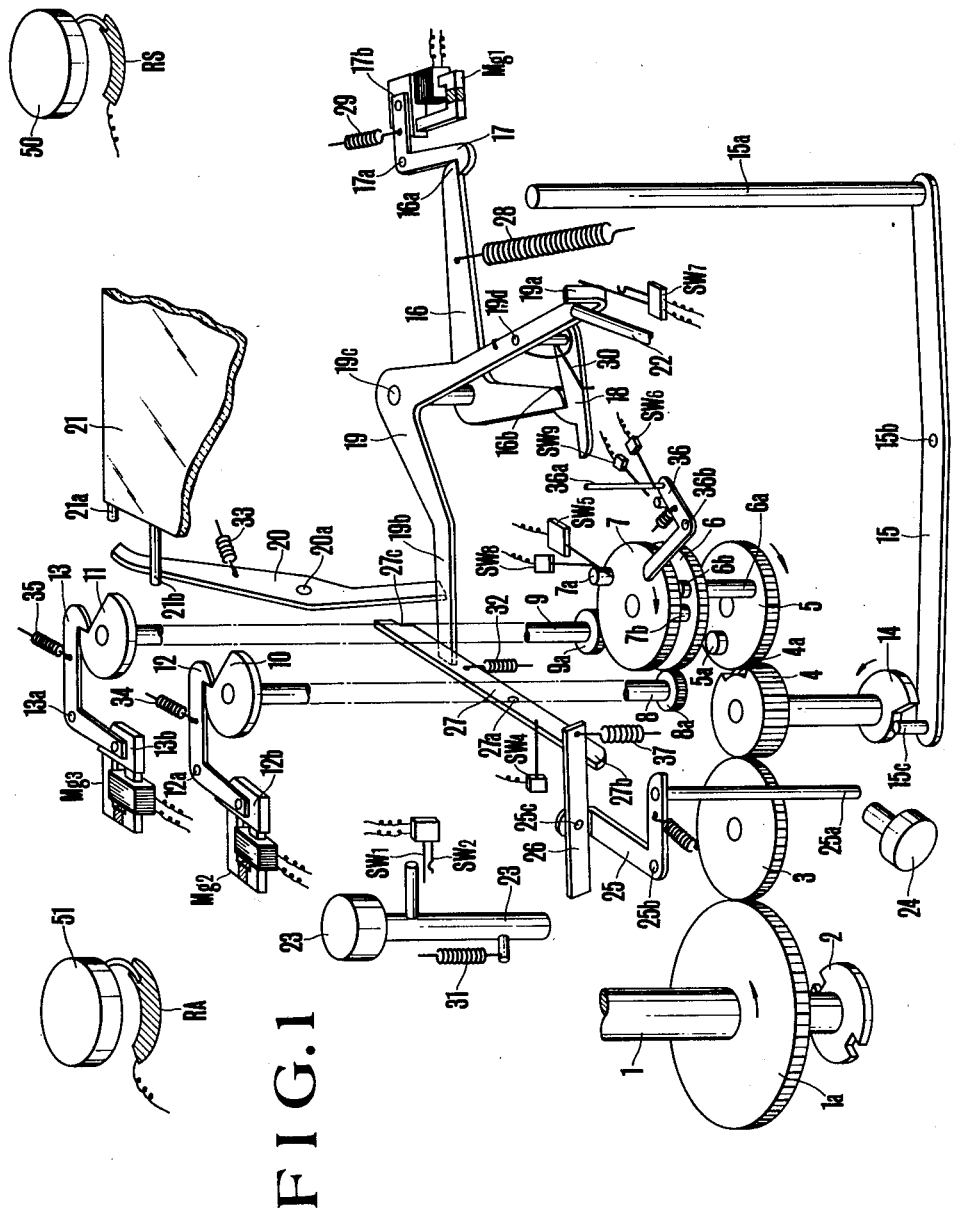
FIGS. 1 and 2 show the internal mechanism of the embodiment of the camera in accordance with the present invention, whereby

8 is the leading shutter curtain shaft on which the one end of the leading shutter curtain is secured, and on whose down end a pinion 8a is secured so as to be engaged with the winding up gear 6 in such a manner that, along with the rotation of the winding up gear 6, the pinion 8a is rotated so as to wind up the leading shutter curtain. 10 is the leading shutter curtain holding plate secured on the upper end of the shaft 10.

9 is the tail shutter curtain shaft on which the one end of the tail shutter curtain is secured and on whose lower end a pinion 9a is secured so as to be engaged with the tail shutter curtain winding up gear 7 in such a manner that, along with the rotation of the gear 7, the pinion 9a is rotated so as to wind up the tail shutter curtain. 11 is the tail shutter curtain holding plate secured on the upper end of the shaft 9.

12 is the leading shutter curtain latch lever supported so as to be rotatable around the shaft 12a, having at the one end a hook part to be engaged with the leading shutter curtain holding plate and at the other end an armature 12b to be attracted by means of the magnet Mg2, whereby the armature 12b is urged by means of the spring 34 along the direction along which the hook part is away from the holding plate 10. 13 is the tail shutter curtain latch lever, supported by means of the shaft 13a, urged by means of the spring 35 and having a hook part 13a and an armature 13b in the same way as in the case of the leading shutter curtain.

Mg2 and Mg3 are the magnets having a permanent magnet, whereby, in the charged state of the shutter, the armatures 12b and 13b are attracted by means of the permanent magnets against the strength of the springs 34 and 35 so as to hold the leading and the tail shutter curtains 10 and 11 by means of the latch levers 12 and 13, while when the magnets are excited, the magnetic force of the permanent magnet is cancelled with that of the excited magnets so as to release the leading and the tail shutter curtains respectively.

On the gear 4, a cam 14 is fixed so as to rotate making one body with the gear 4 in order to charge the driving force for the diaphragm and the mirror in operative engagement with the winding up operation. 19 is the diaphragm driving lever, being supported so as to be rotatable around the fixed shaft 19c, whereby the bent part 19a at the one end is engaged with the diaphragm driving pin 22 while the arm 19b is engaged with the lower end of the mirror operation lever 20. 16 is the energy storing lever supported so as to be rotatable around the shaft 19c of the lever 19. On the one arm of the lever 19, the clutch lever is supported so as to be rotatable around the shaft 19d, being urged by means of the spring 30 and engaged with the energy storing lever 16 in such a manner that the diaphragm 19 is disengageable from the energy storing lever. 17 is the release lever for holding the energy storing lever 16 at the charged position, having a hook part to be engaged with the end 16a of the energy storing lever and armature 17b to be attracted by means of the magnet with a permanent magnet Mg1 and supported so as to be rotatable around the shaft 17a in such a manner that, in the non-excited state of the magnet Mg1, the release lever is at the position at which it is engaged with the energy storing lever, its armature being attracted by means of the permanent magnet. 29 is a spring for urging the armature 17b in the direction along which the armature is away from the magnet.

15 is the intermediary lever supported rotatably around the shaft 15b, the pin 15c, the one end of which lever is engaged with the cam 14 in such a manner that the lever 15 makes one stroke while the cam makes one rotation by means of the winding up operation and the pin 15a at the other end of the lever works upon energy storing lever 16 so as to rotate the lever 16 and the diaphragm driving lever 19 around the shaft 19c along the counter clockwise direction in order to charge the spring provided between the lever 16 and the fixing part. 20 is the mirror driving lever supported to allow swinging around the shaft 20a, whereby the lower end is engaged with the other end 19b of the diaphragm driving lever 19 in the same way as in the above case while the upper end is engaged with the pin 21b of the mirror 21 in such a manner that when the diaphragm driving lever 19 is rotated by means of the strength of the spring 28 out of the position shown in the drawing along the clockwise direction the pin 21b is pushed so as to rotate the mirror around the shaft 21a along the direction of the arrow. 33 is the lever for resetting the lever 20.

22 is the diaphragm driving pin, being engaged with the bent part 19a of the above driving lever so as to close the diaphragm blade up to the preset aperture value when the lever 19 is rotated around the shaft 16c along the clockwise direction. 23 is the release button, being supported so as to be movable upwards and downwards in the drawing in order to close the light measuring switch SW1 with the first stroke and close the release stroke SW2 with the second stroke. 31 is the resetting spring. 24 is the photographic mode change over button provided on the front surface of the camera.

25 is the lever rotatable around the shaft, whereby the pin 25a to be engaged with the photographic mode change over button is provided on the one arm while on the bent part of the other arm the change over lever 26 is supported so as to be rotatable around the pin 25c, whereby the pin 25a is at the position at which the pin 25a is engaged with the change over button 24, being pulled by means of the spring 25d.

27 is the lever for preventing the resetting, being supported so as to be rotatable around the shaft 27a, whereby the one lever 27b is engaged with the lower side of the change over lever 26, while the other end is provided with a notch 27c in which the other arm 19b of the diaphragm driving lever 19 is engaged, being urged by means of the spring 32 along the clockwise direction. In the case of the ordinary photographic mode shown in FIG. 1, the change over lever 26 is pulled by means of a strong spring 37 so as to rotate around the shaft 25c along the clockwise direction and to rotate the preventing lever 27 against the strength of the spring along the counterclockwise direction, whereby the notch 27c remains at the position at which the returning of the diaphragm driving lever is not prevented.

36 is the tail shutter curtain signal lever, whose one arm is engaged with the pin 7a on the tail shutter curtain gear 7 at the termination of the rotation of the curtain gear 7 so as to rotate the shaft 36b and the pin 36a on whose other arm closes the tail shutter curtain signal switches SW6 and SW9.

50 is the film sensitivity setting knob, designed in such a manner that the film sensitivity is set at the variable resistance RS by turning the knob 50. 51 is the aperture value setting knob, so designed that the aperture value is preset at the variable resistance RA in the same way as in the case of the film sensitivity setting knob.

SW1 is the light measuring switch to be closed with the first stroke of the release button. SW2 is the release switch, so designed as to be closed with the second stroke of the release button. SW4 is the photographic mode change over switch, so designed as to be closed when the high speed continuous photographic mode is selected by operating the change over button 24. SW5 is the winding up completion switch, so designed as to be closed when the winding up operation has been completed by means of the pin 7a provided on the tail shutter curtain main gear. SW8 is the winding up completion switch of the motor circuit of the automatic winding up device, so designed as to operate in the same way as in the case of SW5. SW6 is the above mentioned tail shutter curtain signal switch, SW9 is the tail shutter curtain signal switch of the motor circuit of the automatic winding up device and the SW7 is the memory switch, so designed as to be normally closed by means of the end 19a of the aperture driving lever 19 and opened with the rotation of the lever 19. Further, Mg1 is the release magnet.

FIG. 3 shows the composition of another embodiment of the camera in accordance with the present invention, whereby a clutch is provided between the winding up gear and the cam. The drawing shows the ordinary photographic mode, whereby the shutter has been wound up, whereby the same members as those in FIGS. 1 and 2 have the same figures. In the drawing, 38 is the clutch plate secured on the gear 4. 40 is the disc secured on the cam 14, on which disc the clutch lever 40 to be engaged with the notch on the clutch plate 4 is provided so as to be rotatable around the shaft 40a. In the ordinary photographic mode, the clutch lever 40 is connected with the above mentioned clutch plate 38 and, in the case of the high speed continuous photographic mode, the lever 40 is disconnected from the plate 38, whereby the gear 4 and the cam 14 are away from each other. The operation of other parts is the same as that of those in the embodiment shown in FIGS. 1 and 2, so that its detailed explanation is omitted.

Figure 4:
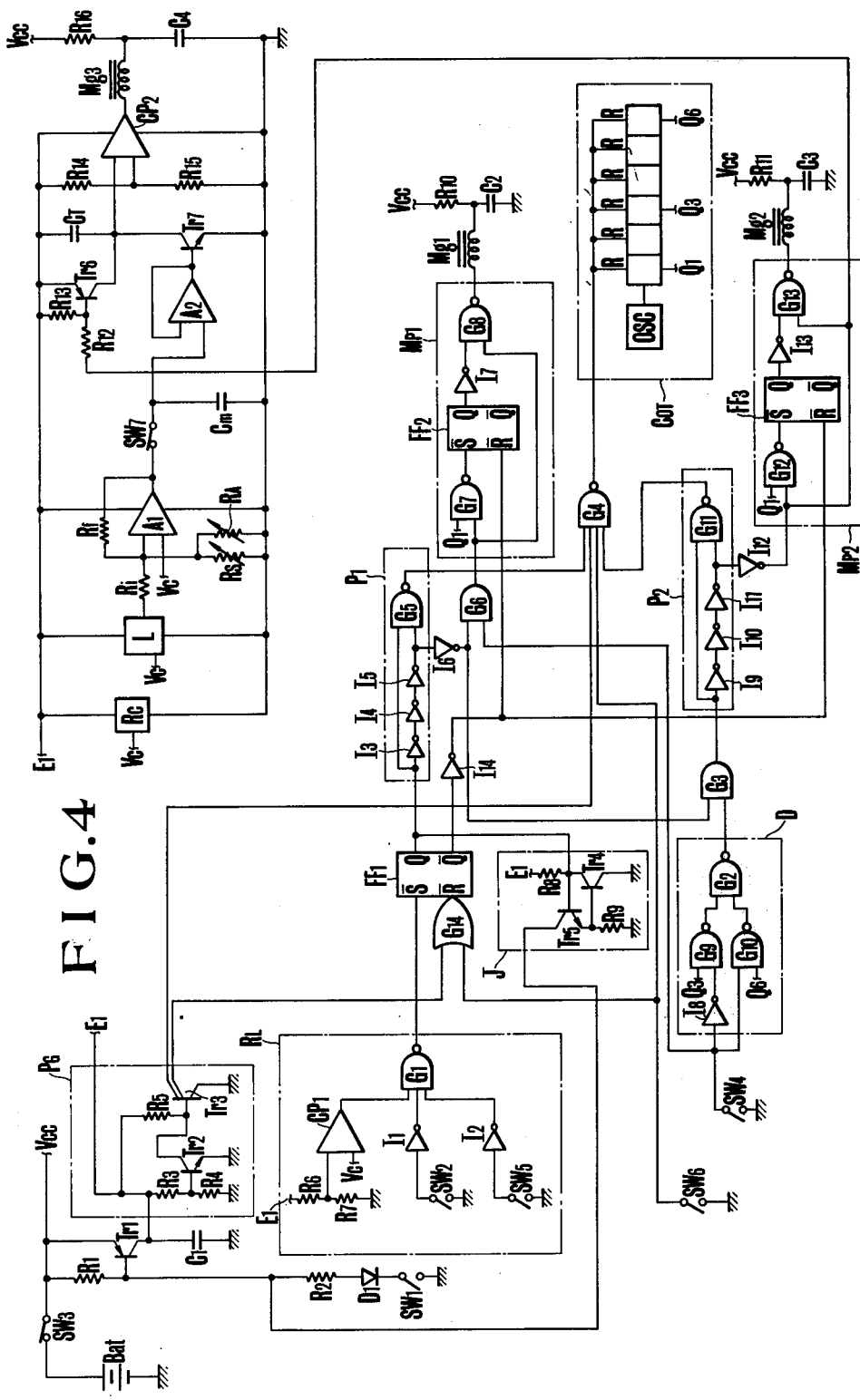
FIG. 4 shows the circuit diagram of an embodiment of the camera in accordance with the present invention.

FIG. 4 shows the circuit composition of an embodiment in accordance with the present invention. In the blocks in dotted lines in the drawing, PG is the reset pulse producing circuits for producing the reset pulse at the closing of the light measuring switch SW1, whereby, when the switch SW1 is closed, the transistor Tr3 is switched on and the collector voltage goes down. When, after the lapse of a certain determined time the condenser C1 has been charged, the transistor Tr2 is switched on and the base voltage goes down while the collector voltage goes up. By means of the above operation, the transistor Tr3 delivers a negative pulse (reset pulse) during the afore mentioned period. The block RL is the circuit whose NAND gate G1 produces a low potential (logic "0") when the release condition is reached, consisting of the comparator CP1, the inverters I1, I2, the NAND gate and so on. R6 and R7 are the voltage dividing resistance of the power source, serving to check the power source voltage in such a manner that CP1 produces a high potential (logic "1") when the voltage of the power source process to be sufficient. SW2 is the release switch, while the SW5 is the winding up completion switch, whereby when the switch is closed the output "1" is produced through the inverters I1 and I2 in such a manner that the NAND gate G1 produces the output "0". Block J is the constant current circuit, so designed that the constant current is produced, when the flip-flop FF1 is set, so as to keep the power source control transistor Tr1 in the switched on state. The flip-flop FF1 is set when the afore mentioned block RL delivers "0". The block P1 is the pulse producing circuit consisting of the inverters I3, I4 and I5 and the NAND gate G5, whereby the gate G5 delivers "0" when the flip-flop FF1 is set so as to delivers "1", while the output of FF1 is input in the NAND gate G5 through the inverters I3, I4 and I5, G5 delivers "1" again. Thus, the negative pulse is produced so as to be delivered to the NAND gate G4. Block D is the delay block so designed to produce a time interval between the generation of the pulse intended for the magnet Mg1 and the generation of the pulse intended for the leading shutter curtain Mg2. In the case of the ordinary photographic mode (when the switch SW4 is opened), when "1" is input to the NAND gate G10 and the Q6 output of the counter has become "1", the NAND gate G10 delivers "0" whereby the output of the NAND gate G2 becomes "1". Further, in the case of the high speed continuous photographing mode, SW4 is closed and "0" is input to the NAND gate G10, whereby the output of G10 becomes "1". "1" is delivered to the one input of G9 through the inverter I8, so that the NAND gate, in which the output of the counter Q3 is input, delivers "0", while G2 delivers the output "1". The outputs Q6 and Q3 of the counter are selected so as to correspond to the delay time until the leading shutter curtain release in the case of the ordinary photographic mode and the high speed continuous photographic mode respectively. The block MP1 is the circuit for driving the first holding magnet Mg1, designed in such a manner that when "1" is input to the one input of the NAND gate G7, the output of the NAND gate G8 becomes "0", whereby Mg1 is driven. When the Q1 output of the counter is supplied to the NAND gate G7, the output of the NAND gate G7 becomes "0", whereby the flip-flop FF2 is set, so that "0" is input in the NAND gate G8 through the inverter I7 while the output of the NAND gate G8 becomes "1", so that the current supply to Mg1 is interrupted. R10 and C2 are the resistance and the condenser constituting the circuit for supplying the exciting current to the magnet Mg1 in the way of pulses. The block P2 is the pulse producing circuit constituted in the same way as in the case of P1, so designed as to produce a reset pulse to be delivered to the NAND gate G4, when the output of the AND gate G3 is "1". When the output of G3, becomes "1", the both inputs to G11 becomes "1" while the output of G11 becomes "0", whereby when after lapse of a delay time determined by the inverters I9, I10 and I11 "0" is input to G11 which in return delivers "1". Thus, the negative reset pulse stops. The block MP2 is the driving circuit of the leading shutter curtain magnet Mg2, designed in such a manner that when the output "1" of the inverter I11 of the block P2 is input in the NAND gate G12 through the inverter I12, "1" is input in G13 at the same time, so that the output of G13 becomes "0". Thus, a current is supplied to the magnet Mg2, whereby when the Q1 output of the counter is input to G12, the output of G13 becomes "0" and the flip-flop FF3 is set. Thus the Q output "0" of FF3 is supplied to G13 through the inverter I13, the output of G13 becomes "1", so that the current supply to the leading shutter curtain magnet Mg2 is interrupted. Further, R11 and C3 are the resistance and the condenser of a circuit for pulse driving the magnet Mg2. The block Cot is the counter for sequence control, designed so as to count the pulses coming from the pulse producing circuit OSC and to be reset by means of "1" from the NAND gate G4 in such a manner that the count outputs Q1, Q5 and Q6 are produced.

The light measuring, the operational, the memory and the time control circuit are constituted with conventional analog control circuits, whereby Rc is the constant voltage circuit, L the light measuring circuit and Vc the standard voltage. A1 is the operational amplifier whereby R5 is the input resistance, Rf the feedback resistance, RS the film sensitivity setting variable resistance and RA the aperture value setting variable resistance. SW7 is the memory switch, Cm the memory condenser and A2 the buffer operational amplifier, whose output controls the transistor Tr7 so as to control the charging current to the time control condenser CT.

Tr6 is the trigger switching transistor, which is triggered by means of the output of the block MP2, so as to start the charging of the condenser CT. CP is the comparator for comparing the constant voltage obtained by means of the R14 and R15 with the terminal voltage of GT in such a manner that when the output of the comparator becomes "0", the tail shutter curtain magnet Mg3 is controlled so as to close the shutter. Hereby, R16 and C4 are the resistance and the condenser for constituting a circuit for pulse driving the magnet Mg3. The current is supplied to each of the above circuit from the power source battery Bat through the power source switch SW3.

Figure 5:
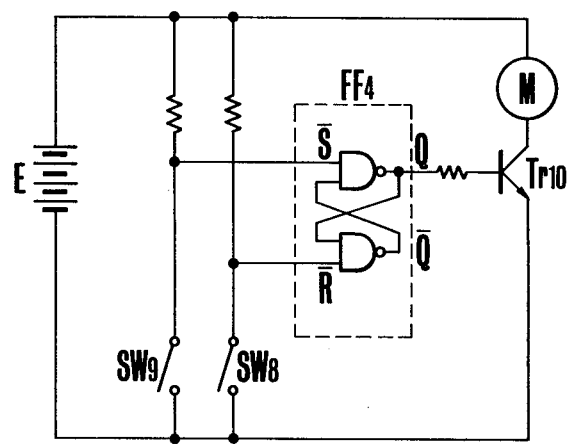
FIG. 5 shows the electrical circuit of the automatic winding up device.

FIG. 5 shows the electrical circuit of the automatic winding up device, whereby E is the power source battery, M the motor, Tr10 the transistor, FF4 the flip-flop, SW8 the winding up completion switch and SW9 the tail shutter curtain signal switch.

Figure 2:
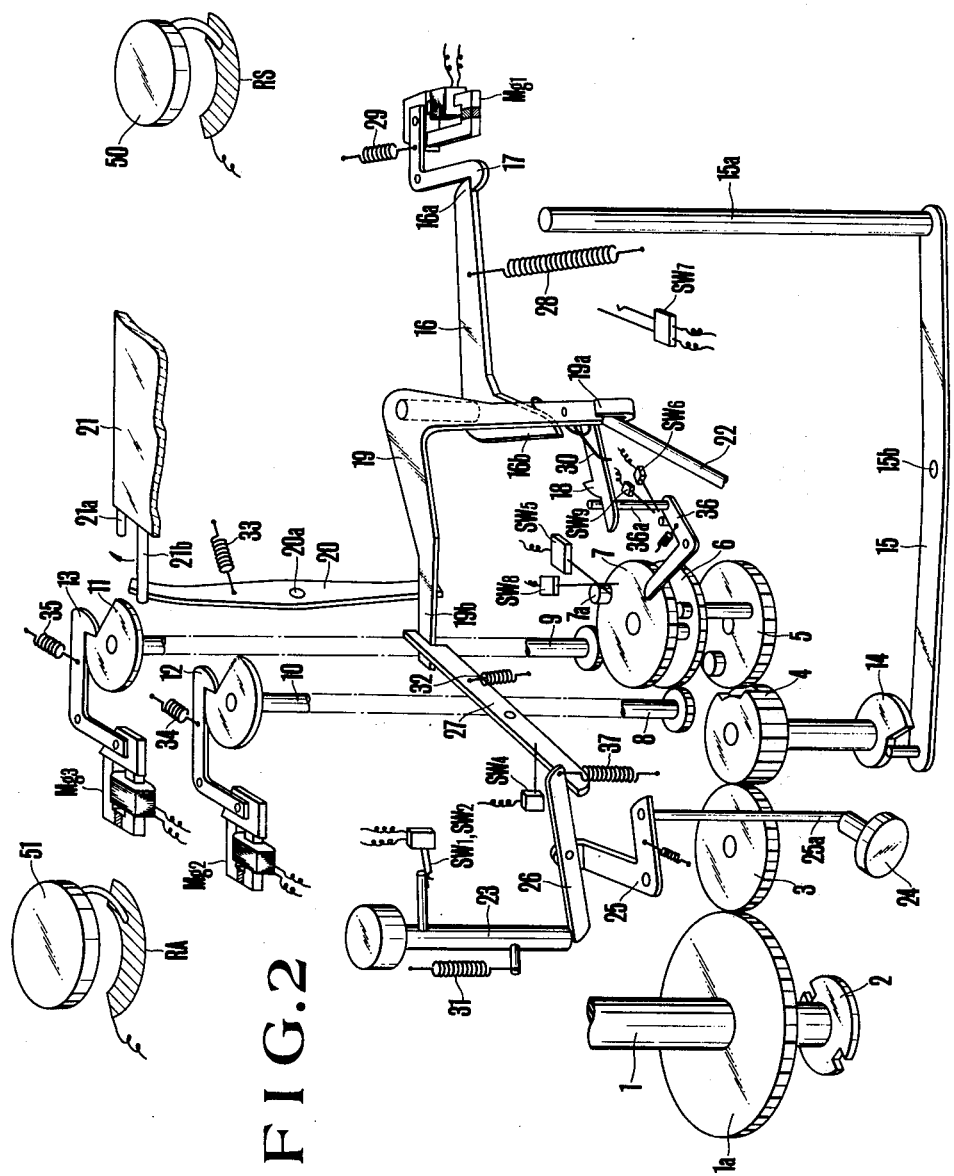

Below the operation of the camera composed as shown in FIGS. 1 and 4 will be explained in detail. Suppose that the camera shown in FIG. 1 is in the wound up state of the shutter while the photographic change over switch is in the ordinary photographic mode (SW4 is opened). When the winding up operation has been completed, the switch SW5 is closed. While, the memory switch SW7 is also closed. When in this state, the release button 23 is operated, the light measuring switch SW1 is closed. Thus, the power source control transistor Tr1 shown in FIG. 4 is brought in the switched on state, whereby the current starts to be supplied to the light measuring part, while the negative reset pulse is produced with the reset pulse producing circuit PG in such a manner that the output of the NAND gate G4 becomes "1", so as to reset the counter Cot. Further, by means of the negative pulse from PG the flip-flop FF1 is reset through the OR gate G14, while the output $\bar{Q}$ of FF1 becomes "0" through the inverter I14 in such a manner that the flip-flops FF2 and FF3 are reset.

At the start of current supply, the light measuring circuit L starts to operate so as to deliver the light measurement output to the operational amplifier A1. Further, the film sensitivity signal set at the resistance RS and the aperture value signal set at the resistance RA are input to A1, which delivers the time signal. This time information is charged in the memory condenser because the memory switch SW7 is closed.

When then the release button 23 in FIG. 1 is further pushed down, the release switch SW2 is closed. When, in this state, the power source voltage is sufficiently high in the circuit RL the comparator CP1 delivers "1" so that the three inputs to the NAND gate G1 become all "0" in such a manner that G1 delivers "0". By means of the "0" output of the NAND gate G1, the flip-flop FF1 is set in such a manner that the Q output of the flip-flop FF1 operates the constant current circuit J, whereby "1" output is applied to the base circuit of the transistor Tr1 so as to keep the power source in the switch on state. Thus, even when the operation of the release button is released, the current continues to be supplied.

Further, the Q output of the set flip-flop FF1 is converted into a pulse in the pulse producing circuit P1, so as to reset the counter Cot. Further, the I5 output "1" of P1 is supplied to the AND gates G6 and G3 through the inverter I6. In the state shown in FIG. 1, the change over switch SW4 is opened and the camera is the ordinary photographic mode so the both inputs to the AND gate G6 are "1" in such a manner that a "1" is supplied to the driving circuit MP1 of the release magnet Mg1 of the next step. Thus, the output of the NAND gate G8 becomes "0" so as to bring the release magnet Mg1 in the conductive state. When then the output Q1 of the counter becomes "1", the NAND gate G7 delivers the "0" output so as to set FF2, whose output Q becomes "0" through the inverter I7, whereby the output of the NAND gate G8 becomes "1", so as to interrupt the current supply to the magnet Mg1.

When the release magnet Mg1 is excited in FIG. 1, the release lever 17 is rotated by means of the strength of the spring 29 along the counter clockwise direction so as to release the energy storing spring 16. The energy storing lever 16 is rotated by means of the strength of the main spring 28 along the clockwise direction against the strength of the returing spring 33 together with the diaphragm driving lever 19, whereby the mirror operating lever 20 is rotated along the counter clockwise direction so as to work upon the pin 21b and lift the mirror 21 around the shaft 21a. Further, the diaphragm pin 22 is pushed by the diaphragm driving lever 19 so as to close the diaphragm blades up to the preset aperture value, whereby the memory switch SW7 is opened. When the memory switch SW7 is opened, the memory condenser Cm stores the time signal corresponding to the proper exposure time immediately before the operation of the mirror.

As mentioned above, "1" is delivered from the output I5 of the pulse producing P1 to the AND gate G3 through the inverter I6, while in the ordinary photographic mode, the switch SW4 is opened so that "1" is input to the NAND gate G10 of the delay circuit D while "0" is input to the NAND gate G9 through the inverter I8. The output of G9 is "1", having nothing to do with the counter, while the output of G10 is at first "1". However, counter Cot counts Q6, the both inputs become "1", so that the NAND gate G2 delivers a "1" when G6 is supplied to G10. The counting time of Q6 by the counter Cot is made to correspond to the operation time of the diaphragm and the mirror, whereby the NAND gate G2 delivers "1" to the AND gate G3, delayed by Q6 from the operation of the afore mentioned release magnet. Further, a "1" is supplied from the inverter I6 to the one input of the NAND gate G3, so that when G2 delivers "1", the AND gate G3 delivers a "1" to be supplied to the NAND gate G4 through the pulse producing circuit P2, whereby the counter is reset by means of the output of G4.

The output from I11 of the circuit P2 is converted into "1" through the inverter I12, so as to be input to the NAND gate G13 of the leading shutter curtain driving circuit MP2, whereby the output of G13 becomes "0" in such a manner that the leading shutter magnet Mg2 is excited. When the output Q1 of the counter becomes "1" later, the output of the NAND gate G12 becomes "0" so as to set the flip-flop FF3. The Q output of the FF3 is input to the NAND gate G13 through the inverter I13, whereby the output of G13 becomes "1" again so as to interrupt the current supply to Mg2. After the release lever 17 has been released in this way in FIG. 1, and the operation time of the diaphragm and the mirror has elapsed, the leading shutter curtain magnet Mg2 is operated so as to release the leading shutter curtain latch lever and allow the leading shutter curtain to start to run. The signal for driving the leading shutter curtain magnet Mg2 is applied to the count starting switching transistor Tr6, whereby Tr6 is brought in the switched off state so as to start the operation of the time constant circuit CT and Tr7 for time control. At this time, a signal corresponding to the time is applied from the memory condenser Cm to the logarithmically enlarging transistor Tr7, so that after the lapse of a certain determined proper time, the output of the comparator CP2 becomes "0" so as to start to supply current to the tail shutter curtain magnet Mg3 and allow the curtain to start to run. When the tail shutter curtain has run, the pin 7a on the tail shutter curtain master gear 7 in FIG. 1 works upon the tail shutter signal lever 36 so as to disengage the pin 36a on the signal lever 36 from the clutch lever 18. Thus, the mirror operation lever 20 and the diaphragm driving lever 19 resume the initial position by means of the strength of the spring 33. The diaphragm blades resume the opened state and the mirror 21 moves downwards by means of a spring (not shown) in the drawing so as to resume the initial position. When simultaneous with the start of the tail shutter curtain the tail shutter curtain master gear 7 is rotated along the counter clockwise direction, the tail shutter curtain signal switch SW6 is closed by means of the tail shutter curtain lever 36. When the switch SW6 in FIG. 4 is closed, a reset signal is supplied to the reset terminal of the counter Cot through the NAND gate G4 so as to reset the counter Cot. In this way, a series of operation after the release operation in the ordinary photographic mode is completed. When then by means of the MD coupler 2 or the winding up lever (not shown) in the drawing, the winding up gear 1a is rotated along the counter clockwise direction so as to wind up the shutter, the notched gear 4 as well as the cam 14 are rotated through the intermediary gear 3 along the counter clockwise direction in such a manner that the shutter system and the energy storing lever resume the state shown in FIG. 1.

Below, the operation in the high speed continuous photographic mode by means of the automatic winding up device will be explained. In this case, the change over button 24 in FIG. 1 is pushed at first. Thus, the pin 25a of the lever 25 is rotated along the counter clockwise direction in such a manner that the left end of the change over lever 26 is moved under the release button 23. At this time point, the lever 25 remains at the position shown in FIG. 1 while the mode change over switch SW4 has not yet been operated so that, even if the release operation is made, the sequence from the release operation until the start of the tail shutter curtain is made in the same way as in the above mentioned case of the ordinary photographic mode in such a manner that after the release of the release lever the diaphragm and the mirror are operated. Then, the leading shutter curtain Mg2 is operated, delayed by the time needed for closing the diaphragm blades and the operation of the mirror. When the release button is operated in the state in which the change over button 24 is being pushed, the left end of the change over lever 26 is pushed down by means of the release button 23 in such a manner that the change over lever 26 is rotated along the counter clockwise direction, so that the prevention lever pushed by the right end of the change over lever 26 becomes rotatable along the clockwise direction, whereby when the diaphragm driving lever 19 is rotated along the clockwise direction so as to be engaged in the notched 27c of the prevention lever 27 in the last range of the operation of the lever 19, while the change over switch SW4 is closed. Namely, when the shutter release operation is made after the change over button 24 is pushed to as to select the high speed continuous photographic mode, the first photograph is taken in the same way as in the case of the ordinary photographic mode, namely the diaphragm and the mirror are operated in the same way as in the case of the ordinary photographic mode. After this operation, the diaphragm and the mirror are clamped in the closed state and lifted up state respectively, while the change over switch SW4 in the circuit is changed over. After this, the leading shutter curtain starts to run and the time is controlled, the tail shutter curtain starts to run with the tail shutter curtain start signal. At the termination of the tail shutter curtain running, the pin 7a works upon the switch SW6 and SW9, whereby the tail shutter curtain signal is produced so as to reset the counter Cot while "0" is input in $\overline{S}$ of the flip-flop FF4 in the motor circuit shown in FIG. 5, so that Q delivers "1", when the transistor Tr10 is brought in the switched on state so as to start the motor M. The rotation of the motor M is transferred to the gear 1a through the coupler 2 so as to charge the shutter in the same way as in the above mentioned case. When the gear 7 is rotated along the direction of the arrow until the pin 7a on the gear 7 reached the position shown in the drawing and the winding up completion switch SW8 is closed, "0" is input in $\overline{R}$ of the flip-flop FF4 and Q delivers "0" outpt so that the transistor Tr10 is brought in the switched off state and the motor M stops. At the same time, the switch SW5 is closed, the flip-flop FF1 is set by means of the output of the NAND gate G1 in the same way as in the above mentioned case of the sequence, so that "1" is input to the AND gates G6 and G1 through the pulse producing circuit P1. Because, at this time, the switch SW4 is closed, G6 is not opened, so that the driving circuit MP1 of the release magnet Mg1 in the next step does not operate, whereby the energy storing lever 16 shown in FIG. 2, being held by the lever 17, remains in the charged state. At this time, the SW4 is closed so that the "0" is input to the NAND gate G10 in the delay circuit D and therefore, the output of G10 is "1", and has nothing to do with the counter. Further, a "1" is supplied to the NAND gate G9 through the inverter I8, so that when the counter delivers G3, G9 delivers "0", whereby the output of the NAND gate G2 becomes "1". Namely, in the case of the high speed continuous photographic mode, the output "1" is delivered from the AND gate G3 in a relatively short time after the winding up completion switch SW5 is closed. p The operation after that is the same as in the above mentioned case, namely, the tail shutter curtain is driven at a proper time after the leading shutter curtain magnet Mg2 is driven. In the case of the high speed continuous photographic mode, the memory switch SW7 is opened at the operation start of the release for the first photograph and kept in the opened state, so that memory condenser Cm keeps storing the value for the first photograph during the continuous photographic mode. Further, in the case of the winding up in this mode, the energy storing lever 16 remains in the charged state and kept state by means of the release lever 17, so that the lever 15 runs freely or the energy storing lever 16 is overcharged in a position a little farther than the holding position along the counter clockwise direction and therefore, the load at the winding up is increased little. When the operation of the release button 23 is released at the termination of the high speed continuous photographic mode, the prevention lever 27 is rotated along the counter clockwise direction along with the rotation of the change over lever 26 along the clockwise direction, whereby the diaphragm lever 19, kept until then, is released and rotated by means of the spring 33 around the shaft 20 along the clockwise direction, whereby the diaphragm and the mirror assume the initial position immediately in such a manner that the image photographed can be confirmed in the view finder.

Another embodiment of the camera in accordance with the present invention shown in FIG. 3 is provided with a clutch 40 for separating the winding up system from the cam 14 in operative engagement with the change over button 24. Thus, in the case of the high speed continuous photographic mode after operating the change over button 24, only the clutch plate 38 runs freely while the cam 14 as well as the lever 15 remain in quiescent so that the overcharge of the energy storing lever 16 in the embodiment shown in FIGS. 1 and 2 can be avoided. Other components and the operation of this embodiment are same as those in the embodiment shown in FIGS. 1 and 2 so that the explanation will be omitted.

As explained above, in the case of the camera in accordance with the present invention, the ordinary continuous photographic mode and the high speed continuous photographic mode can simply be changed over between other in such a manner that, in the case of the high speed continuous photographic mode, the time for each photographing can be shortened by locking the operation of the aperture and mirror so as to enable the high speed photography. Thus, even in the case of the high speed photographic mode, the object can immediately be confirmed in the view finder before and after the release operation.

What is claimed is:

1. A single lens reflex camera on which an automatic winding up device can be mounted and which is capable of continuous photographing by repeating the diaphragm operation, the mirror operation, the shutter operation and the winding up operation in sequence by means of the release operation comprising:
   a lens having a variable diaphragm;
   a movable mirror;
   a driving member for stopping-down the diaphragm to a predetermined value and for actuating the movable mirror;
   charging means for energizing the driving member;
   means for holding the driving member at its charging position;
   release means for releasing the holding of the driving member in response to a pressure by a release button, said driving member operating the diaphragm and the mirror before the shutter operation and said member resuming the initial position after the shutter operation so as to bring the diaphragm and the mirror in the initial state;
   mode change over means for changing over to an ordinary photographic mode where the diaphragm and the movable mirror operate for each photograph taken and a high speed continuous photographic mode where a continuous photographing is performed while maintaining the diaphragm in its stopped-down state and the mirror in its lifted-up state; and
   prevention means to be displaced in operative engagement with the change over means so as to prevent the operation of the driving member from resuming.

2. A single lens reflex camera in accordance with claim 1 comprising:
an automatic exposure control means;
a memory means for the determination of the exposure condition;
whereby when the change over means is changed over into the high speed continuous photographic mode, the measured light value for the first picture after the release operation being maintained by the memory means until the termination of the continuous photographing.

* * * * *